Patented Jan. 1, 1929.

1,697,107

UNITED STATES PATENT OFFICE.

HEINRICH CLINGESTEIN, OF COLOGNE-ON-THE-RHINE, GERMANY, AND HARRY W. GRIMMEL, OF ALBANY, NEW YORK, ASSIGNORS TO GRASSELLI DYESTUFF CORPORATION, OF NEW YORK, N. Y., A CORPORATION OF DELAWARE.

PRIMARY DISAZO DYES DERIVED FROM DIAMINO CARBAZOLES AND ARYLIMINO COMPOUNDS.

No Drawing. Original application filed March 21, 1927, Serial No. 177,208, and in Germany March 24, 1926. Divided and this application filed November 28, 1927. Serial No. 236,361.

The present invention relates to new primary disazo dyes derived from diamino carbazoles and arylimino compounds.

We have found that exceedingly valuable new azo-dyestuffs, insoluble in water, having most probably the general formula:

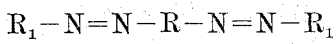

wherein R represents the residue of an unsulfonated diamino-carbazole compound, and $R_1$ represents an unsulfonated aryl-iminocompound, are obtained by coupling the tetrazo-compounds of unsulfonated diamino-carbazole compounds with unsulfonated aryl-imino-compounds such as, for example, arylids of 2.3-hydroxy-naphtholic acid, hydroxynaphtho-carbazoles, diaceto-acetic acid arylids or the like.

The new dyestuffs thus obtained are, in the dry state, yellowish-brown to violet to blue to black powders, insoluble in water, soluble in concentrated sulfuric acid to the production of solutions which, for the most part, have a bluish coloration. When produced directly on vegetable fibers, these dyestuffs dye very clear yellowish-brown to violet to blue to deep black shades of particular fastness properties; for example, fastness to light and to kier-boiling. These fastness properties especially distinguish our dyestuffs from the dyestuffs obtained by coupling tetrazotized diamino-carbazole-compounds with β-naphthol, which latter dyestuffs already are known.

The most valuable of our dyestuffs are those with deep blue to black shades.

Our dyestuffs produce excellent lakes when mixed with, or precipitated upon, the usual substrates.

In order to further illustrate the invention, the following example is given, it being understood that our invention is not limited thereto:

Example.

The yarn is well boiled and dried and then padded with a solution containing per liter 12 grams of 7-hydroxy-naphtho-carbazole, 25 ccm. of 34° Bé. caustic soda solution and 20 ccm. of Turkey red oil. After developing with a solution containing per liter the tetrazo-compound from 5 grams of 2.7-diaminocarbazole, the yarn is found to be dyed deep black of exceedingly good fastness properties.

The dyestuff precipitated on the fibre has most probably the formula:

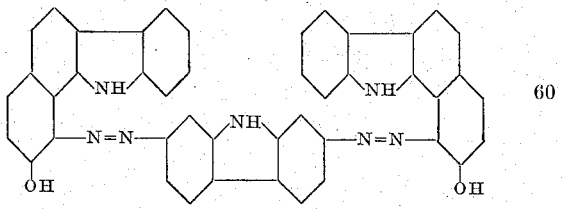

The dyestuff itself is a bluish-black powder insoluble in water but soluble in concentrated sulfuric acid with a blue coloration. By mixing the sulfuric acid solution with water, reddish-blue flakes are obtained. In pyridine it dissolves with a bluish coloration. By reduction with stannous chloride and hydrochloric acid there are obtained 2.7-diamino-carbazole and 8-amino-7-hydroxy-2-1-naphtho-carbazole having the formula:

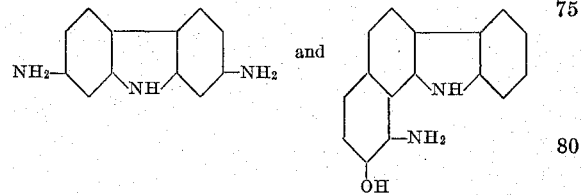

This is a division of our co-pending application Ser. No. 177,208, filed March 21, 1927.

We claim:

1. Process which comprises coupling a tetrazotized unsulfonated 2.7-diamino-carbazole compound with an unsulfonated hydroxy-naphthocarbazole.

2. Process which comprises coupling a tetrazotized unsulfonated 2.7-diamino-carbazole compound with unsulfonated 7-hydroxy-naphthocarbazole.

3. As new products water-insoluble azo dyestuffs having the general formula:

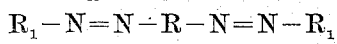

wherein R represents the residue of an unsulfonated diamino carbazole compound and $R_1$ represents the residue of an unsulfonated hydroxy-naphtho-carbazole compound which dyestuffs are, in the dry state, yellowish-brown to violet to blue to black powders, insoluble in water, and soluble in concentrated sulfuric acid to the production of solutions which, for the most part, have a bluish coloration.

4. As new products water-insoluble azo dyestuffs having the general formula:

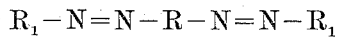

wherein R represents the residue of an unsulfonated 2.7-diamino carbazole compound and $R_1$ represents the residue of an unsulfonated hydroxy-naphtho-carbazole compound which dyestuffs are, in the dry state, yellowish-brown to violet to blue to black powders, insoluble in water, and soluble in concentrated sulfuric acid to the production of solutions which, for the most part, have a bluish coloration.

5. As a new product, a water-insoluble azo-dyestuff having most probably the formula:

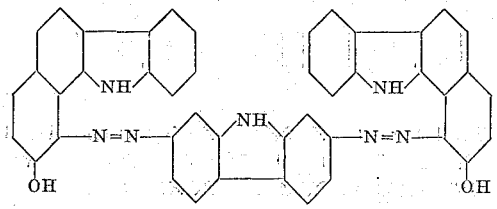

being in the dry state a bluish-black powder insoluble in water but soluble in concentrated sulfuric acid with a blue coloration.

6. The material dyed with the dyestuff defined in claim 3.

7. The material dyed with the dyestuff defined in claim 4.

8. The material dyed with the dyestuff defined in claim 5.

In testimony whereof we have hereunto set our hands.

HEINRICH CLINGESTEIN.
HARRY GRIMMEL.